Patented July 8, 1941

2,248,356

UNITED STATES PATENT OFFICE 2,248,356

METHOD OF PREPARING AMINATED ESTERS

Paul C. Jones, Akron, Ohio, assignor to The B. F. Goodrich Company, New York, N. Y., a corporation of New York No Drawing. Application December 5, 1939, Serial No. 307,634

5 Claims. (Cl. 260—302)

This invention relates to a new method of preparing organic compounds.

It has previously been observed that primary or secondary amines could be reacted with thioalkylene hydrins to form aminated esters containing a single thio-acid group connected to an amino nitrogen through a carbon atom. It has not heretofore been recognized that such aminated esters are themselves amines capable in some cases of undergoing the same reaction even though they contain the radical of the thio-acid.

I have now found that even primary or secondary amines containing as substituents the acidic residues formed by the removal of hydrogen from the sulfhydryl groups of a thio-acid may be reacted with thioalkylene hydrins having the general formula R—S—A—OH wherein R represents a member of the class consisting of thiazyl, oxazyl, thiozolinyl, and oxazolinyl groups and A represents an alkylene group.

Representative amine reactants contain an acidic residue formed by the removal of hydrogen from the sulfhydryl group of a thio-acid such as the dimethylthiocarbamylthio, methyl-ethyl-thiocarbamylthio, dibenzylthiocarbamylthio, diphenylthiocarbamylthio, phenyl-beta-naphthyl-thiocarbamylthio, 2-benzothiazylthio, 2-(4,5-dimethyl) thiazylthio, 2-thiazolinylthio, 2-(5-phenyl) thiazolinylthio, methanecarbothioylthio, or ethylxanthogenylthio groups bound to a carbon atom adjoining the amino nitrogen group of a simple primary amine such as cyclohexyl amine, ethylene diamine, aniline, o-toluidine, ethanolamine, p-phenylene diamine, etc., or a simple secondary amine such as dimethyl amine, diphenyl amine, phenyl-beta-naphthyl amine, dicyclohexyl amine, ethyl cyclohexyl amine, benzyl ethyl amine, etc.

Such compounds as

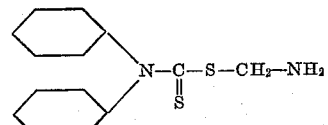
Diphenylthiocarbamylthiomethylamine

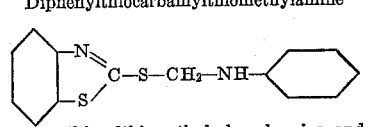
2-benzothiazylthiomethyl phenyl amine, and

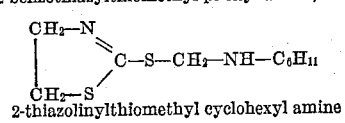
2-thiazolinylthiomethyl cyclohexyl amine may accordingly be reacted with thioalkylene hydrins to produce compounds containing two similar residues of thio-acids, two dissimilar residues of thio-acids, or even a compound containing three dissimilar residues of thio-acids such as 2-thiazolinylthiomethyl 2-benzothiazylthiomethyl diphenyl-thiocarbamylthiomethyl amine. Cyclic secondary amines such as piperidine, piperazine, tetramethyl piperazine, morpholine, etc. containing residues of thio-acids as substituents on a carbon atom adjoining the amino nitrogen may also be employed in the reaction.

Instead of employing thioalkylene hydrins as reactants, it is within the scope of this invention to employ mixtures of formaldehyde and a mercaptothiazole, mercaptooxazole, mercaptothiazoline, or mercaptooxazoline. Such mixtures react, as disclosed in U. S. Patent No. 2,040,467, to produce thioalkylene hydrins. Thus the reaction of equimolar proportions of 2-mercaptobenzothiazole, formaldehyde, and 2-thiazolinylthiomethyl cyclohexyl amine is fully equivalent to and produces the same products as the reaction of equimolar proportions of 2-benzothiazyl thiomethylene hydrin and 2-thiazolinylthiomethyl cyclohexyl amine.

It is preferred to employ as the other reactant the 2-thiomethylene hydrin derivatives of the aliphatic thiazoles, arylene thiazoles, and thiazolines such as

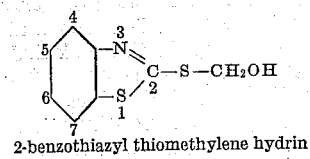
2-benzothiazyl thiomethylene hydrin

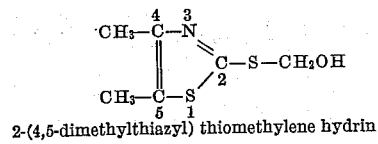
2-(4,5-dimethylthiazyl) thiomethylene hydrin

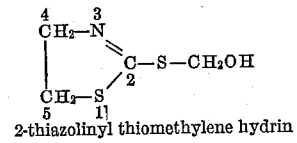
2-thiazolinyl thiomethylene hydrin and similar thioalkylene hydrins of naphtholthiazole, toluthiazole, 5-nitrothiazole, 6-methoxythiazole, benzoxazole, 4,5-diethylthiazole, 4,5-dimethoxythiazole, 4-phenylthiazole, 4,5-dimethyloxazole, 4,4-dimethyl thiazoline, 4-methyl-5-ethyl-thiazoline, 4-chlormethylthiazoline, etc.

It is to be understood that other thioalkylene hydrins such as thioethylene hydrins may be employed, the compounds in which the alkylene group contains not over five carbon atoms being preferred.

The reaction between the thioalkylene hydrin and the primary or secondary amine is ordinarily performed at ordinary temperatures or at moderately elevated temperatures. The reaction, which is usually exothermic, often proceeds spontaneously. If required, heat may be supplied until the reaction starts. When aromatic amines are employed as reactants, it is desirable not to attempt to carry on the reaction at over 200° C., for at temperatures around 250° or 300° C., the Hofmann-Martius rearrangement occurs. Although different conditions are necessary when using different reactants, those skilled in the art will experience little difficulty in confining the substitution mainly to the nitrogen atom and preventing the Hofmann-Martius rearrangement by performing the reaction at the proper temperature. It will be understood that the thioalkylene hydrin and amine are reacted in proportions which depend upon the number of replaceable hydrogens on the amino group. Thus when a secondary amine is used, the amine and thioalkylene hydrin are reacted in equimolar proportions, when a primary amine is used the amine and thioalkylene-hydrin are reacted in equimolar proportions or a ratio of 1:2. The proper reacting ratios for polyamines are determined in the same manner.

The nature of the reaction may be better understood from the following specific example:

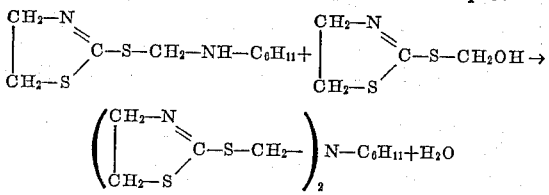

8.9 grams of 2-thiazolinylthiomethyl cyclohexyl amine were mixed with 5.8 grams of 2-thiazolinyl thiomethylene hydrin and heated to drive off 0.8 gram of water. The mass became pasty, and then set to a hard solid believed to be bis-2 thiazolinylthiomethyl cyclohexyl amine.

It is to be understood that this example merely illustrates a preferred method of performing the invention, and that modifications and variations which will be obvious to those skilled in the art are within the spirit and scope of the invention as defined in the appended claims.

This application is a continuation-in-part of Serial No. 266,153 filed April 5, 1939.

I claim:

1. The method of preparing aminated esters which comprises reacting, with elimination of water by the combination of the —OH group of a thioalkylene hydrin and the —H of an amino group, a compound having the general formula R—S—A—OH wherein R represents a member of the class consisting of thiazyl, oxazyl, thiazolinyl, and oxazolinyl groups and A represents an alkylene group with a member of the class consisting of primary and secondary amines containing as a substituent, bound to a carbon atom adjoining an amino nitrogen of the amine, the acidic residue formed by removal of —H from the SH group of a thio-acid.

2. The method of preparing aminated esters which comprises reacting, with elimination of water by combination of the —OH group of a thiomethylene hydrin and the —H of an amino group, a compound having the general formula R—S—CH₂OH wherein R represents a member of the class consisting of thiazyl, oxazyl, thiazolinyl, and oxazolinyl groups with a member of the class consisting of primary and secondary amines containing as a substituent, bound to a carbon atom adjoining an amino nitrogen of the amine, the acidic residue formed by the removal of —H from the —SH group of a thio-acid.

3. The method of preparing aminated esters which comprises reacting, with elimination of water by combination of the —OH group of a thiomethylene hydrin and the —H of an amino group, a compound having the general formula R—S—CH₂OH wherein R represents a thiazolinyl group with a member of the class consisting of primary and secondary amines containing as a substituent, bound to a carbon atom adjoining an amino nitrogen of the amine, the acidic residue formed by the removal of —H from the —SH group of a thio-acid.

4. The method of preparing aminated esters which comprises reacting, with elimination of water by combination of the —OH group of a thioalkylene hydrin and the —H of an amino group, a compound having the general formula R—S—A—OH wherein R represents a member of the class consisting of thiazyl, oxazyl, thiazolinyl, and oxazolinyl groups and A represents an alkylene group with a member of the class consisting of primary and secondary amines containing as a substituent, bound to a carbon atom adjoining an amino nitrogen of the amine, a thiazolinylthio group.

5. The method of preparing bis-2-thiazolinylthiomethyl cyclohexyl amine which comprises reacting with the elimination of water 2-thiazolinylthiomethyl cyclohexyl amine and 2-thiazolinyl thiomethylene hydrin in equimolar proportions.

PAUL C. JONES.